CHARLES H. COLEMAN JR.
ROBERT P. MACKENZIE
INVENTORS

BY Robert G. Clay

ATTORNEY

CHARLES H. COLEMAN JR.
ROBERT P. MACKENZIE
INVENTORS
BY Robert G. Clay
ATTORNEY

United States Patent Office 3,428,745

Patented Feb. 18, 1969

3,428,745

HEAD-TO-TAPE VELOCITY ERROR COMPENSATOR FOR ROTARY HEAD VIDEO TAPE RECORDERS

Charles H. Coleman, Jr., Belmont, and Robert P. MacKenzie, Los Altos, Calif., assignors to Ampex Corporation, Redwood City, Calif., a corporation of California Filed Mar. 24, 1966, Ser. No. 537,116

U.S. Cl. 178—6.6 11 Claims

Int. Cl. H04n 5/78

ABSTRACT OF THE DISCLOSURE

In a head-to-tape velocity error compensator for rotary head video tape recording, a system employing means for continuous compensation of phase shift of the color subcarrier of the playback signal occurring within the horizontal line as the line traverses from left to right in the reproduced picture. The system includes means for generating a stepped error signal having steps of levels proportional to the time difference between horizontal synchronizing pulses of the video signals and reference pulses. The duration of each level corresponds to the time of a horizontal line. Memory means store potentials representative of the step level differences between successive steps until such times as the same heads are next reproducing the same lines. Ramp generating means respond to the polarity and magnitude of the stored signals and generate responsive ramp signals. Means responsive to said ramp signals and said stepped signal in turn produce a continuous error signal to control an electrically variable delay line within a time base error corrector receiving the video signal.

Figure 1:
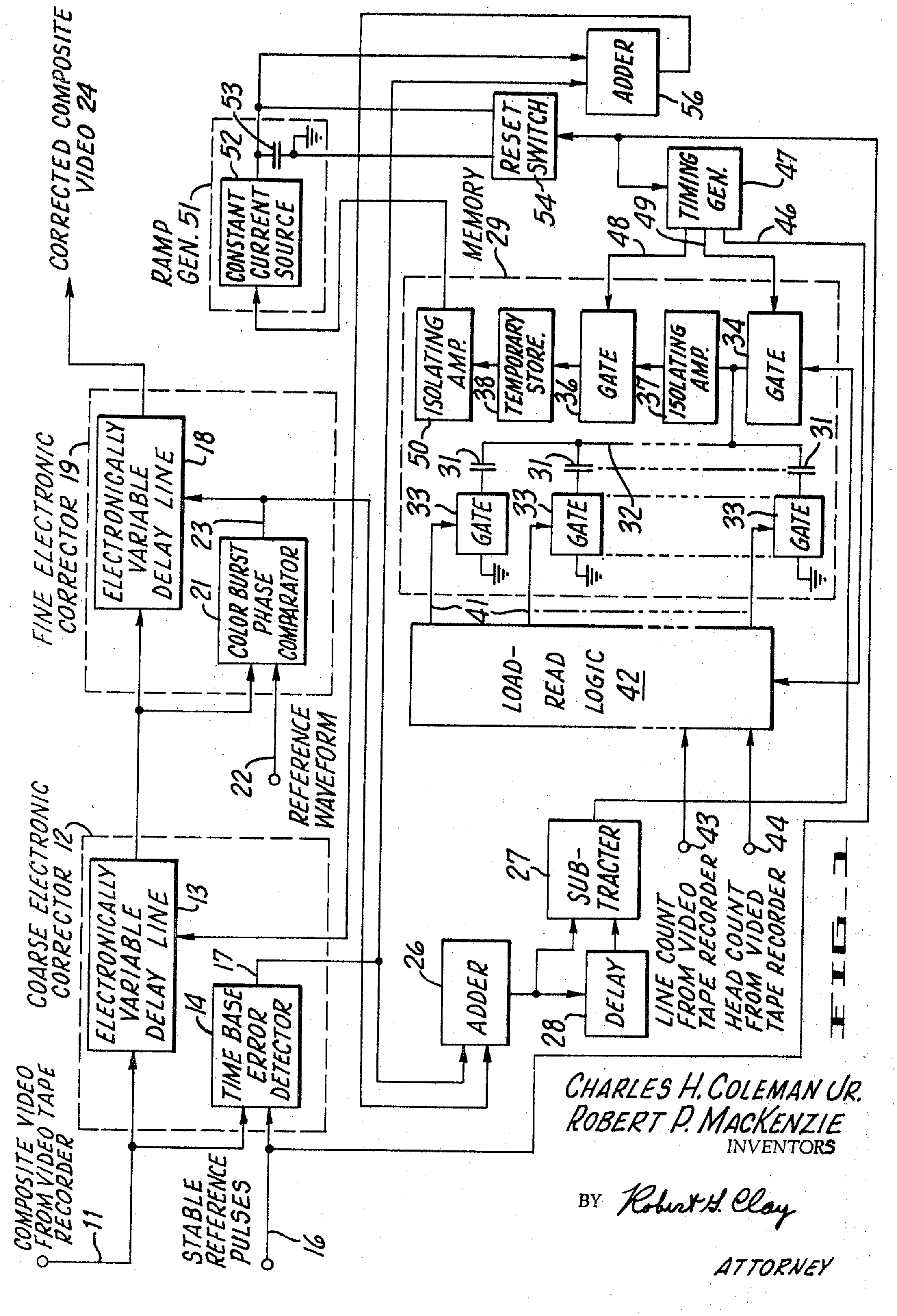

This invention relates generally to the compensation of unavoidable timing or time base errors in the guiding of magnetic tape in rotary head video tape recorders which produced head-to-tape velocity errors or differences between playback and recording, and is more particularly directed to the compensation of such velocity errors which occur within each horizontal line of a color television recording and produce a progressive phase shift of the color subcarrier as each line traverses from left to right in the reproduced picture.

Among the more serious of uncorrected picture defects which exist with present color rotary head video tape recorders, including both the transverse scan and helical scan varieties, are those resulting from head-to-tape velocity error, i.e., error due to differences between the relative head-to-tape velocity during recording and that during playback. Velocity error is a component of time base error and arises from unavoidable geometric errors in the guiding of tape in the recorder. Time base error causes mis-position of the horizontal synchronizing pulses and erroneous phase of the color subcarrier bursts of the reproduced color television signal. Heretofore such errors have been compensated by circuits arranged to correct the phase of the reproduced color television signal respectively in accordance with a detected position error of each horizontal synchronizing pulse, and a detected phase error of each color burst thereof. Circuits of this type are respectively described in U.S. Patent No. 3,202,769 and in U.S. Patent Nos. 3,100,816; 3,213192; and 3,225,134. Although the time base error has been thus compensated at the start of each horizontal line of the color television signal, the compensation is only exact at the start of each line and may progressively deteriorate during the line. More particularly, a velocity error component of the time base error may exist between the start and end of the line. This can result in an undesirable shift of hue progressing from left to right in the color television picture which may appear as visible color error at the right side of the picture, color hue banding, or the like. The effect is particularly detrimental to dubbing, in that similar hue errors add linearly from dubbed generation to generation.

It is therefore an object of the present invention to provide a system for compensating head-to-tape velocity error occurring within each horizontal line of a reproduced color television signal from a rotary head video tape recorder.

Another object of the invention is to provide a head-to-tape velocity error compensating system which functions to continuously correct the phase of a color television signal reproduced by a rotary head video tape recorder.

Still another object of the invention is the provision of a system of the class described which is capable of substantially eliminating color hue banding in off-tape reproduced color television signals.

It is yet another object of the invention to provide a system which is operable to compensate head-to-tape velocity error in existing tape recordings recorded by existing video tape recorders.

It is a further object of the invention to provide a head-to-tape velocity error compensating system which may be readily fabricated in the form of a small compact unit.

Figure 2:
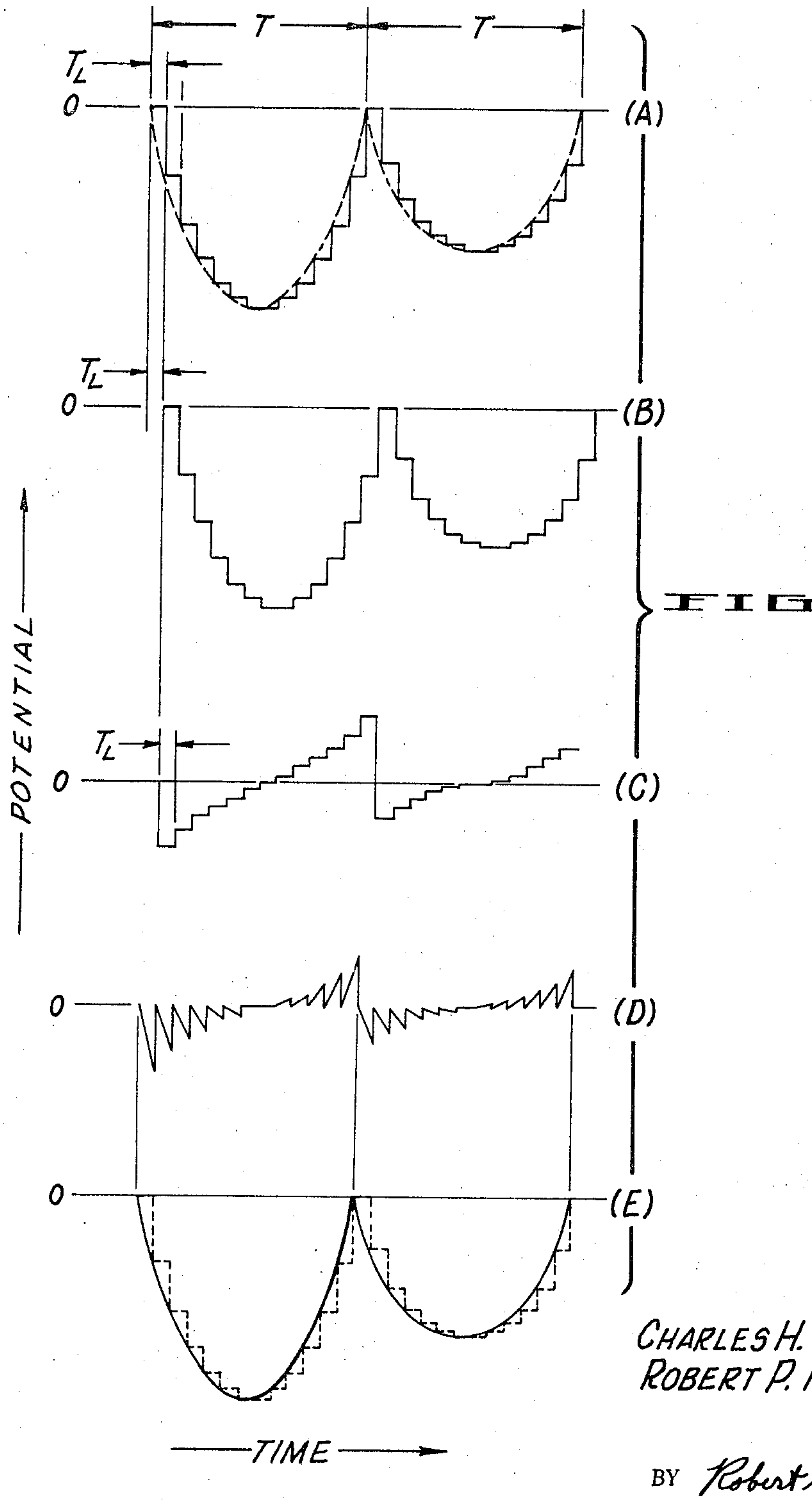

Other objects and advantages of the invention will become apparent upon consideration of the following detailed description thereof in conjunction with the accompanying drawings, wherein:

FIGURE 1 is a block diagram of a head-to-tape velocity error compensating system in accordance with the present invention; and FIGURE 2 is a graphical presentation of various waveforms resulting from one example of velocity error plotted as a function of time which occur in the system of FIGURE 1.

Referring now to FIGURE 1, the composite color video output 11 from a rotary head video tape recorder containing time base errors is applied to a coarse electronic corrector 12 of a type typically employed to compensate for mis-positioning of the horizontal synchronizing pulses of the video signal which occurs due to head-to-tape velocity error between recording and playback. U.S. Patent No. 3,202,769 discloses such a corrector in detail which basically includes an electronically variable delay line 13 for receiving the video output 11, and a time base error detector 14 for comparing the phase of the horizontal synchronizing pulses of the video signal to that of a stable reference pulse input 16 to derive an error voltage output 17 proportional to phase departures of the synchronizing pulses from the reference pulses. Heretofore, it has been the practice to apply the error voltage output 17 to a control input of the delay line 13 to vary the phase of the video signal 11 in compensatory relation to the error voltage. In this manner the video signal is affected by a suitable time delay to bring the horizontal synchronizing pulses into alignment with the pulses of the reference input 16, and thereby compensate for mis-positioning of the synchronizing pulses.

As is conventional, the compensated output of the delay line 13 of corrector 12 is applied to the input of an electronically variable delay line 18 of a fine electronic corrector 19, of the type disclosed by U.S. Patent Nos. 3,100,816; 3,213,192; and 3,225,134. In this regard, the fine corrector includes a color burst phase comparator 21 energized by the video signal from corrector 12 and by a reference subcarrier waveform input 22. The comparator is effective to develop an error voltage output 23 proportional to departures in the phase of the color bursts of the video signal from that of the reference input 22.

The error voltage output 23 is in turn applied to a control input of the delay line 18 to vary the phase of the video signal passing through the line in compensatory relation to the phase departures of the color bursts. As a result, substantially exact compensation of color phase error is obtained at the start of each horizontal line of the video signal appearing at the output 24 of the fine corrector delay line 18. It is of particular importance to note, however, that the horizontal synchronizing pulses and color bursts occur only once per horizontal line of the video signal. Heretofore, the coarse and fine electronic correctors 12 and 19 have accordingly provided nearly exact compensation only at the start of each horizontal line. More particularly, the compensating adjustments effected by the correctors are set at the start of each horizontal line and persist for the duration of the line until readjustments are made at the start of the next line. Consequently, head-to-tape velocity error may occur within each horizontal line with a progressive phase shift of the color subcarrier as the line traverses from left to right in the television picture. As noted previously, such residual velocity error may appear as undesirable color hue banding or other visible color error in the television picture.

The foregoing will be better understood upon reference to FIGURE 2*a* which illustrates in dashed line an example of true time base error in the reproduced video signal line 11 due to a mis-adjustment of female guide height in the video tape recorder, and in full line the corresponding error voltage output 17 of the error detector 14 of the coarse corrector 12, but corrected for false timing errors in a manner subsequently described. The true error in this example will be seen to be a smooth parabolic curve lasting for the period T between head switch times, with sudden reversals of direction at these times. The error voltage output, on the other hand, will be seen to be a stepped approximation of the original error waveform. More particularly, the error detector 14 measures the error only at discrete times at a horizontal line rate and holds the correction voltage at constant level for the duration $T_L$ of each picture line and then resets the level before the start of the next line. Thus, the difference between the true error and the error voltage output 17 is always zero at the beginning of a line and follows an essentially straight slope in either the positive or negative direction in various amounts until the difference is again zero at the start of the next line. It will be thus appreciated that in the conventional arrangement where the error voltage output 17 is utilized to control the delay of delay line 13 to compensate the time base error, the compensating phase adjustment is exact only at the start of each line and is otherwise in error by the just mentioned difference slopes within the duration $T_L$ of the respective lines. The error voltage output 23 of the fine corrector 19 consists of random voltage levels remaining constant for the duration of a line and which accurately represent the error present at this point only at discrete times occurring at the horizontal rate, namely at the beginning of each line.

In accordance with the present invention, the stepped error voltage output 17 of the error detector 14 is converted to a continuous waveform closely approximating the true time base error, prior to application to the control input of the coarse corrector electronically variable delay line 13. More particularly, a series of ramps are generated simulating the difference slopes between the true time base error and stepped error voltage output 17 occurring over the line duration $T_L$, and such ramps are appropriately added to the error voltage output. The resulting waveform is a series of straight-line segments connected together and closely approximating the smooth parabolas of the true error. A satisfactory approximation to the slope velocity component required for a given line may be obtained by forming a straight-line ramp starting at the beginning of the line and rising linearly, until, at the end of the line, the ramp reaches a magnitude equal to the level of the next step of the error voltage output 17. However, the only measure of how large to make the ramp for a given line is the level of the error voltage step at the end of the line, which step occurs too late in time to be used. The problem is overcome in accordance with the present invention by taking advantage of the fact that the velocity error on a given picture line tends to be the same each time that line occurs. Accordingly, the inventive system basically includes means for measuring the differences between the levels of successive steps of the error voltage output 17, means for storing voltages representative of the step differences according to magnetic head and line until such time as the same head is reproducing the same line, and means operative at each such time to generate a ramp having a slope and direction proportional to the magnitude and polarity of the corresponding stored difference voltage and add the ramp to the stepped error voltage outpot.

Considering now the head-to-tape velocity error compensating system outlined hereinbefore in detail as to a preferred embodiment thereof, it is first to be noted that the error voltage output 17 of time base error detector 14 is derived from the position of the leading edge of a single synchronizing pulse, which may be subject to false timing due to noise, switching transients, or, more importantly, various timing errors in the originally recorded synchronizing pulses. The levels of the stepped error voltage output 17 may thus be somewhat in error. However, any false timing error sensed by the detector 14 and subsequently responsively compensated by the delay line 13 will result in an error in the burst phase of the compensated video signal applied to the fine corrector 19. Such burst phase error is sensed by the comparator 21 and appears in the error voltage output 23. Therefore, to correct any false timing error in the error voltage output 17, the error voltage output 23 is added thereto, as by means of an adder 26. The resulting output of the adder is then then the error output 17, but with any errors in the step levels removed. Such output is the full line waveform illustrated in FIGURE 2(*a*).

In order to measure the difference between successive step levels, the output of the adder 26 is directly applied to one input of a subtracter 27, and through a delay 28 to a second input thereof. The delay is arranged to delay the adder output by the duration $T_L$ of a horizontal line of the video signal 11, as depicted in FIGURE 2(*b*). Thus, during each line duration, the subtracter takes the algebraic difference between a given step level and successive step level of the error voltage output. The subtracter output is therefore a staircase waveform, as illustrated in FIGURE 2(*c*). Each step has the line duration $T_L$ and a level and polarity representative of the difference between levels of corresponding successive steps of the error voltage output. In the illustrated case, the staircase has steps which progressively decrease in negative level, become zero, and then progressively increase in positive level.

A memory 29 is provided to store the voltage levels of the steps of the staircase waveform from the subtracter according to head and line until the next time the same head is scanning the same line. Various memory arrangements for accomplishing this end will suggest themselves to those skilled in the art. For example, the memory may be a capacitor store, time shared loading and reading arrangements, as illustrated in the figure, in the interests of simplicity, compactness, and minimization of the number of components required. More particularly, the memory includes a plurality of stores provided as storage capacitors 31 respectively corresponding to the lines of the video signal scanned in one complete revolution of the head drum. In this regard, there are typically about 64 capacitors, to correspond to the 16 lines scanned on the average by each of the four heads in one revolution of the drum. It should be noted that it is not necessary for a capacitor to be provided for each line in the television picture. A capacitor for each line in one rotation of the head drum is sufficient inasmuch as geometric error is a function of the angular position of each head with respect to the tape and the angular position of a given head relative to the tape is substantially the same each time such head plays a certain line after its engagement with the tape.

Each capacitor 31 is connected at one side to a common bus 32, and at the other side to a control gate 33 which is in turn connected to ground. The common bus is coupled by means of a load gate 34 to the output of the substracter 27. The common bus is also coupled to a read gate 36, as by means of an isolating amplifier 37, and such gate is coupled to a temporary store 38. Gating inputs of the gates 33 are connected each to a different one of a corresponding plurality of output lines 41 of a load-read logic circuit 42. Inputs of the logic circuit are connected to line and head count outputs 43 and 44 from the video tape recorder reproducing the video signal 11. The line count output is a series of pulses respectively initiated at the start of each horizontal line of the video signal 11 reproduced by the video tape recorder. The head count output consists of pulses initiated each time a different head begins scanning the tape. A further input of the logic circuit is connected to an output line 46 of a timing generator 47, and output lines 48 and 49 of this generator are connected to gating inputs of gates 36 and 34 respectively. The timing generator is coupled in receiving relation to the reference pulse input 16, for the purpose of synchronization.

The logic circuit 42 may include, for example, binary counters interconnected by a logic matrix to the output lines 41 in such a manner that responsive to various combinations of head and line count pulses, gating pulses from output line 46 of timing generator 47 are routed to perdetermined ones of the lines 41. In this regard, the successive lines 41 as viewed from top to bottom of the figure may represent head 1, video line 1; head 1, video line 2; etc., with the bottom one of the lines 41 representing head 4, video line 16. Then, for example, in response to the first head count pulse and second line count pulse from outputs 43 and 44, the logic circuit establishes a path from the timing generator line 46 to the output line 41 that corresponds to head 1, video line 2. The timing generator is arranged to initiate a gating pulse in line 46 in coincidence with the leading edge of each pulse of reference pulse input 16, and thus at the start of each horizontal line of the video signal 11. Such gating pulse has a duration substantially less than that of the horizontal line. The timing generator also produces a second relatively short duration gating pulse in output line 46 at some time following the first gating pulse and within the horizontal line duration. Thus, for each line of the video signal, there is provided in the timing generator output line 46 a pair of control gate pulses, one at the start of the video line, and another at a later time prior to the end of the line. The first gate pulse corresponding to the second television line scanned by head 1 is routed to the logic output line 41 corresponding to head 1, video line 2, by virtue of the previously noted path established by the logic circuit. In response to the second gate pulse associated with this video line, the logic circuit functions to establish a path for such gate pulse to the output line 41 that corresponds to the preceeding video line, in the present case the head 1, video line 1, output line.

Upon the occurrence of a combination of first head and third line count pulses, the logic circuit shifts to establish a path between timing generator output lines 46 and the output line 41 corresponding to head 1, video line 3. This output line thus receives the first gate pulse corresponding to video line 3 at the start thereof. The second gate pulse associated with video line 3 triggers the logic circuit to establish a path for the gate pulse to the output line 41 corresponding to head 1, video line 2. The gates 33 coupled to the output lines 41 having gating pulses thereon are gated open by such pulses to thereby couple the associated capacitors 31 to ground and establish paths for current flow. In this manner, each capacitor is connected to ground at the start of scanning of a corresponding television line by a corresponding head, and the capacitor corresponding to the preceding television line is connected to ground at a subsequent time within the duration of the succeding line.

The timing generator 47 is effective to generate a sampling pulse in output line 48 at a time and for a duration within the duration of the first gating pulse of the pair thereof generated in output line 46 for each horizontal line of the video signal. The timing generator also generates a sampling pulse in output line 49 at a time and for a duration within the duration of the second gating pulse of each pair thereof. Thus, while each capacitor 31 is grounded by means of its associated gate 33 at the start of scanning of a corresponding video line by a corresponding head, the read gate 36 is opened by a sampling pulse in output line 48 to thereby transfer the charge on such capacitor to the temporary store 38. At a later time within the duration of the same video line, while the capacitor corresponding to the preceding video line is coupled to ground by its associated gate 33, the load gate 34 is opened by a sampling pulse in output line 49 to thereby charge such capacitor to the then existing potential at the output of subtracter 27. This poential is representative of the difference between the levels of the stepped error voltage output at the start and end of the video line to which the capacitor corresponds. Thus, when a given head starts to scan a given video line, the potential on the corresponding capacitor representative of the step level difference in the error voltage output at the time the same video line was scanned by the same head during the previous head drum rotation, is read into the temporary store. At a subsequent time during scanning of such given line, the capacitor corresponding to the preceding video line is adjusted to the step level difference for this video line which now appears at the output of subtracter 27. Eventually, the pulses of current applied to a given capacitor by sampling of the subtracter output once per revolution of the head drum, charge the capacitor to a potential representative of the average velocity error for the corresponding video line. It should be noted that a complication exists in that the velocity error of the last line in each head pass cannot be directly measured since a head switch occurs prior to the next step of the error voltage output. The difficulty may be practically circumvented by making use of the fact that, while a given numbered head pass usually contains 16 lines, at least three times per frame it will contain 17 lines. Accordingly, the logic circuit 42 is so arranged that the capacitor 31 corresponding to video line 16 of each head is loaded by the sampled subtracter output for line 17 each time line 17 occurs. The potential on the line 16 capacitor is sampled and applied to the temporary store 39, each time line 17 occurs. Consequently, the potential on each line 16 capacitor is substantially an average of the step level differences for lines 16 and 17 and is read into the temporary store in correspondence with the occurrence of line 16, and is correspondence with the occurrence of line 17 whenever it occurs.

The potential at the temporary store 38 is applied as by means of isolating amplifier 50 to a ramp generator 51 which preferably includes a constant current source 52 driving a shunt capacitor 53. The magnitude of the current output of the source is proportional to the potential applied to its input from the temporary store 38. This potential is of course changed at the start of each horizontal video line to the appropriate average level difference read into the temporary store from the corresponding capacitor 31. The capacitor 53 is charged linearly by the source current to develop a ramp having a slope determined by the current magnitude, and a direction determined by the current polarity. A normally open electronic reset switch 54 is connected in parallel with the capacitor 53 and controlled by the stable reference pulse source 16. In this regard, each reference pulse momentarily closes the switch in the interval between lines at a time just prior to the generation of a sampling pulse in output line 48 of timing generator 47. The capacitor 53 is thus discharged such that each ramp initiated in response to the immediately following sampling pulse in output line 48 starts at zero. Consequently, each ramp is initiated at the start of a video line by a sampling pulse and is terminated at the end of the line by the reset switch 54. The ramp height at the instant of termination is proportional to the potential applied from the temporary store 38. Therefore, each ramp that is generated is substantially the one that is required to interconnect successive steps of the stepped error voltage of time base error detector 14 in the period between the beginning and end of the particular video line being then scanned.

It will be thus appreciated that the output of the ramp generator 51 is substantially as illustrated in FIGURE 2(*d*). The slopes and directions of the respective ramps are determined by the steps of the staircase waveform of FIGURE 2(*c*) developed during the previous head drum rotation. However, by virtue of the action of the memory 29, the ramp waveform is generated in appropriate time correlation to the stepped error voltage output of time base error detector 14 generated during the present head drum rotation. The ramp waveform from ramp generator 51 and the error voltage output from error detector 14 are applied to an adder 56 which adds the respective signals to provide an output waveform as illustrated in FIGURE 2(*e*). The error voltage is shown in dashed line, while the ramp waveform as added to the error voltage is shown in full line. The output waveform is thus a series of interconnected ramps providing a continuous error signal which very closely approximates the head-to-tape velocity error of the video signal 11 at every instant of time. This output of the adder 56 is applied to the control input of the electronically variable delay line 13 of the coarse electronic corrector 12. The polarity of the output signal is such as to shift the phase of the video signal passing through the delay line in compensatory relation to the head-to-tape velocity error. Since the output signal is continuous, rather than being stepped, the correction of the error is continuous and effected over the entire duration of each television line. Hue shift banding, and other undesirable visible color error arising from differences in head-to-tape speed between recording and playback are thus substantially removed by the system of the present invention.

Although the invention has been described hereinbefore with respect to a single preferred embodiment, it will be appreciated that various changes and modifications may be made therein without departing from the true spirit and scope of the invention, and thus it is not intended to limit the invention except by the terms of the following claims.

What is claimed is:

1. In combination with a time base error corrector of a type including an electronically variable delay line having a signal input receiving a composite color video signal reproduced by a rotary head video tape recorder having a plurality of magnetic heads on a rotary head drum successively scanning predetermined horizontal lines of a video tape recording, a signal output, and a control input for varying the phase of the video signal passing between the signal input and output in accordance with an error signal applied to the control input, said corrector further including a time base error detector receiving the video signal and reference pulses at a horizontal line rate to compare the horizontal synchronizing pulses of the video signal to the reference pulses and develop a stepped error voltage output having steps with levels proportional to time differences between the synchronizing and reference pulses persisting for the duration of the horizontal lines of the video signal, a head-to-tape velocity error compensator comprising differencing means coupled to said output of said time base error detector for measuring differences between the levels of successive steps thereof and generating a difference signal proportional thereto, memory means coupled to said differencing means for storing potentials representative of the respective step level differences of said difference signal according to said magnetic heads and predetermined horizontal lines scanned by said heads until such times as the same heads are next reproducing the same lines, ramp generating means coupled to said memory means for generating a ramp voltage at each such time having a slope and direction proportional to the magnitude and polarity of the corresponding potential stored by said memory means, and means coupled to said time base error detector and said ramp generating means for adding said ramp voltages to said stepped error voltage output to produce a continuous error signal and apply same to said control input of said electronically variable delay line.

2. The combination of claim 1, further defined by said differencing means comprising a subtractor for producing a signal at an output thereof proportional to the difference between signals at first and second inputs thereof, said first input of said subtractor coupled to said output of said time base error detector, and delay means coupled between said output of said time base error detector and said second input to introduce a delay equal to the duration of a horizontal line of said video signal.

3. The combination of claim 1, further defined by a fine electronic corrector including a second electronically varible delay line having a signal input coupled to the signal output of the delay line of said coarse electronic corrector, a signal output, and a control input for varying the phase of the video signal passing between the signal input and output of said second delay line in accordance with an error signal applied to the control input thereof, said fine corrector further including a color burst phase comparator receiving the video signal from the output of said first delay line and a reference waveform at a horizontal line rate to develop an error voltage output proportional to phase differences between the color bursts of said video signal and said reference waveform, said output of said phase comparator coupled to the control input of said second delay line, and an adder having inputs respectively coupled to said output of said time base error detector and said output of said color burst phase comparator to produce an output proportional to the sum thereof, said output of said adder coupled to said differencing means.

4. The combination of claim 3, further defined by said differencing means comprising a subtracter for producing a signal at an output thereof proportional to the difference between signals at first and second inputs thereof, said first input of said subtracter coupled to said output of said adder, and delay means coupled between said output of said adder and said second input of said subtractor to introduce a delay equal to the duration of a horizontal line of said video signal.

5. The combination of claim 1, further defined by said memory means comprising a plurality of memory stores corresponding to said predetermined horizontal lines as scanned by respective ones of said magnetic heads, a temporary store coupled to said ramp generating means, means for transferring potential from each memory store to the temporary store at the start of scanning of the particular horizontal line by the particular head to which the memory store corresponds, means for transferring potential from said differencing means to the memory store corresponding to the horizontal line preceding said particular line being scanned by said particular head at a time within the duration of said particular line, and means for resetting said ramp generating means to zero immediately prior to the start of scanning of each horizontal line of said video signal.

6. The combination of claim 5, further defined by a fine electronic corrector including a second electronically variable delay line having a signal input coupled to the signal output of the delay line of said coarse electronic corrector, a signal output, and a control input for varying the phase of the video signal passing between the signal input and output of said second delay line in accordance with an error signal applied to the control input thereof, said fine corrector further including a color burst phase comparator receiving the video signal from the output of said first delay line and a reference waveform at a horizontal line rate to develop an error voltage output proportional to phase differences between the color bursts of said video signal and said reference waveform, said output of said phase comparator coupled to the control input of said second delay line, and an adder having inputs respectively coupled to said output of said time base error detector and said output of said color burst phase comparator to produce an output proportionla to the sum thereof, said output of said adder coupled to said differencing means.

7. The combination of claim 6, further defined by said differencing means comprising a subtracter for producing a signal at an output thereof proportional to the difference between signals at first and second inputs thereof, said first input of said subtracter coupled to said output of said adder, and delay means coupled between said output of said adder and second input of said subtracter to introduce a delay equal to the duration of a horizontal line of said video signal.

8. The combination of claim 1, further defined by said memory means comprising a plurality of storage capacitors corresponding to said predetermined horizontal lines as scanned by respective ones of said magnetic heads, a corresponding plurality of control gates coupling first sides of said capacitors to ground, said gates having gating inputs, a common bus connected to second sides of said capacitors, a load gate coupling said differencing means to said common bus, said load gate having a gating input, a temporary store coupled to said ramp generating means, a read gate coupled between said common bus and said temporary store, said read gate having a gating input, a timing generator synchronized with said reference pulses and having first, second, and third output lines, said timing generator generating a first control gate pulse in said first output line at the start of each horizontal line of said video signal and a second control gate pulse at a later time within the duration thereof, said timing generator generating a sampling pulse in said second output line of shorter duration than each of said first control gate pulses and within the duration thereof, said timing generator generating a sampling pulse in said third output line of shorter duration than each of said second control gate pulses and within the duration thereof, said second and third output lines of said timing generator respectively connected to said gating inputs of said read and load gates, a load-read logic circuit having first, second, and third inputs and a plurality of output lines corresponding to horizontal lines of said video signal as scanned by respective ones of said magnetic heads, said output lines of said logic circuit correspondingly connected to said gating inputs of said control gates, means generating head and line count outputs representative of the respective heads scanning horizontal lines of said video signal and the respective horizontal lines scanned by said heads, said head and line count outputs coupled to said first and second inputs of said logic circuit, said logic circuit successively establishing paths between said third input thereof and different ones of said output lines thereof corresponding to the particular head and line represented by said head and line count outputs coupled to said first and second inputs of sented by said line count output, said first output line of said timing generator coupled to said third input of said logic circuit whereby said first control gate pulses are transmitted along the particular paths established by said logic circuit in accordance with said head and line count outputs, said logic circuit in response to each of said second control gate pulses establishing a path and transmitting the second control gate pulse thereover between said third input and the output line of said logic circuit corresponding to the horizontal line of said video signal preceding that represented by said head and line count outputs, and means for resetting said ramp generating means to zero immediately prior to the start of scanning of each horizontal line of said video signal.

9. The combination of claim 8, further defined by said ramp generating means comprising a constant current source coupled to said temporary store for generating an output current having a magnitude proportional to the potential of said temporary store, and a shunt capacitor coupled to the output of said constant current source, said means for resetting said ramp generator comprising normally open switch means connected in parallel with said shunt capacitor and having a switching input for closing the switch means in response to pulses applied thereto, said switching input coupled in receiving relation to said reference pulses.

10. The combination of claim 9, further defined by a fine electronic corrector including a second electronically variable delay line having a signal input coupled to the signal output of the delay line of said coarse electronic corrector, a signal output, and a control input for varying the phase of the video signal passing between the signal input and output of said second delay line in accordance with an error signal applied to the control input thereof, said fine corrector further including a color burst phase comparator receiving the video signal from the output of said first delay line and a reference waveform at a horizontal line rate to develop an error voltage output proportional to phase differences between the color bursts of said video signal and said reference waveform, said output of said phase comparator coupled to the control input of said second delay line, and an adder having inputs respectively coupled to said output of said time base error detector and said output of said color burst phase comparator to produce an output proportional to the sum thereof, said output of said adder coupled ot said differencing means.

11. The combination of claim 10, further defined by said differencing means comprising a subtracter for producing a signal at an output thereof proportional to the difference between signals at first and second inputs thereof, said first input of said subtracter coupled to said output of said adder, and delay means coupled between said output of said adder and said second input of said subtracter to introduce a delay equal to the duration of a horizontal line of said video signal.

References Cited

UNITED STATES PATENTS 3,213,192 10/1965 Jensen ------------- 178—5.4

ROBERT L. GRIFFIN, *Primary Examiner.*

D. STOUT, *Assistant Examiner.*

U.S. Cl. X.R.

178—5.4